United States Patent [19]

Haldenwanger et al.

[11] Patent Number: 5,271,658
[45] Date of Patent: Dec. 21, 1993

[54] PLASTIC FENDER FOR MOTOR VEHICLES

[75] Inventors: Hans-Gunther Haldenwanger; Manfred Rotte, both of Ingolstadt, Fed. Rep. of Germany

[73] Assignee: Audi AG, Ingolstadt, Fed. Rep. of Germany

[21] Appl. No.: 915,846

[22] PCT Filed: Feb. 2, 1991

[86] PCT No.: PCT/EP91/00196

§ 371 Date: Jul. 24, 1992

§ 102(e) Date: Jul. 24, 1992

[87] PCT Pub. No.: WO91/15392

PCT Pub. Date: Oct. 17, 1991

[30] Foreign Application Priority Data

Mar. 31, 1990 [DE] Fed. Rep. of Germany ....... 4010453

[51] Int. Cl.⁵ .................................. B62D 29/04
[52] U.S. Cl. .................... 296/198; 296/191; 296/29; 296/901
[58] Field of Search ............... 296/198, 191, 194, 195, 296/29, 901, 146 R

[56] References Cited

U.S. PATENT DOCUMENTS

| | | | |
|---|---|---|---|
| 1,699,572 | 1/1929 | Scheid | 280/848 |
| 4,564,232 | 1/1986 | Fujimori et al. | 296/146 |
| 4,607,878 | 8/1986 | Itoh | 296/199 |
| 4,707,020 | 11/1987 | Enokida et al. | 296/191 |
| 4,892,348 | 1/1990 | Nozaki | 296/146 |
| 4,912,826 | 4/1990 | Dixon et al. | 296/198 X |

FOREIGN PATENT DOCUMENTS

| | | |
|---|---|---|
| 438312 | 7/1927 | Fed. Rep. of Germany . |
| 473098 | 2/1929 | Fed. Rep. of Germany . |
| 614573 | 10/1933 | Fed. Rep. of Germany . |
| 719204 | 4/1942 | Fed. Rep. of Germany . |
| 1192936 | 5/1958 | Fed. Rep. of Germany . |
| 3007760 | 9/1980 | Fed. Rep. of Germany . |
| 3737230 | 5/1989 | Fed. Rep. of Germany . |
| 2360459 | 3/1978 | France . |
| 2450190 | 9/1980 | France . |
| 2594400 | 8/1987 | France . |

OTHER PUBLICATIONS

Vergleich zwischen Karosserien aus Kunststoff und aus Leichtmetall, Sep. 1954, pp. 239-241.
Eugen und Bodo Stier, Oberndorf a.N., Sep. 11, 1967.

Primary Examiner—Robert R. Song
Attorney, Agent, or Firm—Lalos & Keegan

[57] ABSTRACT

A plastic fender is stiffly and immovably attached to the body of a motor vehicle. The fender includes an attachment flange and a washer to be positioned between the fender attachment flange and a screw head. The washer includes at least one spherical cup-shaped impression that is pressed into the fender, resulting in positive locking which prevents movement of the fender. Stiff attachment can also be provided by a steel rail embedded in the attachment flange or steel rails attached to the sides of the attachment flange or by embedding the flange in a relatively stiff retaining part.

7 Claims, 2 Drawing Sheets

PLASTIC FENDER FOR MOTOR VEHICLES

BACKGROUND OF THE INVENTION

The invention relates to a fender made of plastic for motor vehicles.

Plastic fenders are known, for example, from DE-A-3 007 760. In practice, screws, similar to those used for steel sheet fenders, are used to attach the plastic fenders. The screws allow easy replacement of the fenders. One feature of the plastic fenders is that when heated they expand significantly more than their steel sheet counterparts.

In order for thermal expansion in plastic fenders not to lead to twisting and undesirable deformation, the connection between the fender and body is made such that the fender can move relative to the body. The attachments of the fender to the body are shaped so that one side is rigidly fixed to the body, while the other sides can move. An attachment of this type can be made so that the openings for admitting the screws in the fender are enlarged vis-a-vis the shaft diameter of the screws or are made as an elongated hole. In practice, the side of the fender facing the vehicle doors is generally rigidly attached so that the expansion of the elongated fender is possible only in the direction away from the side doors to the front or to the back. Accordingly the elongated holes for admitting the screws in the upper edge area of the fender also extend in this direction. The attachment openings in the area of the fender facing away from the doors, for a front fender the forward edge area, must be made analogously to this. While movable fixing of the upper edge area of the fender does not entail any additional problems, since the gap between the fender and a flap which connects it to the center of the vehicle remains roughly the same, in practice movement of the forward edge area (here and also for the following description a front fender is always assumed) causes more difficulties. Specifically, several parts, for example a front part and a headlight, connect to the forward edge areas of the fender. If at this point the fender expends to the front, to some extent it is not flush vis-a-vis these parts; optically this is as unattractive as if there were correspondingly large gaps for compensating for this movement.

SUMMARY OF THE INVENTION

The object of the invention is to design the attachment of a plastic fender such that the aforementioned problems in thermal expansion of the fender are prevented.

Because the fender, due to the proposed measures, is held stiff and stationary in its upper, its forward and its rear edge area, the parts which connect to the fender can be attached in the same way as in a fender made of steel sheet.

Special measures which take into account the expansion of the fender are unnecessary. The gaps between the fender and the adjacent parts can accordingly be kept very narrow. Since the fender in its upper, its forward and its rear edge area is held stiff and stationary on the body of the motor vehicle, it can only bulge to the outside with the given fixing and its shape. This effect is hardly perceptible to the eye or if, due to high temperature, serious bulging occurs, is not disruptive since the bulging takes place uniformly.

Washers are arranged between the screw heads and the fender at least in sections for purposes of stationary attachment. These washers have at least one projection on their side acting upon the fender. This design has the advantage that there is positive locking preventing displacement without notch action. When the screws are tightened the spherical cup-shaped projections specifically are pressed into the plastic fender, by means of which the desired form-fit connection is produced.

The problem of the invention can also be solved by embedding the attachment flange of the fender in a steel rail. This attachment flange is also found in conventional fenders made of steel sheet and is used to attach the fender to the screw bed of the body. The proposed fender could therefore be structured like a steel sheet fender. The steel rail embedded in the attachment flange makes the screw area very stiff and in conjunction with the screws admitted through the attachment flange prevents movement in this area.

Instead of the steel rail embedded in the attachment flange, it is of course also possible to arrange a steel rail of this type on one or both sides of the attachment flange. Preferably the steel rails are permanently connected to the attachment flange; this can be done, for example, by cementing the steel rails to the attachment flange. This configuration avoids insertion of a steel part in the manufacture of the fender, however in the same way it ensures stiff and stationary attachment of the fender to the body.

Finally, the fender can have an attachment flange which is embedded in a separate attachment part made of relatively stiff material. This type of attachment is recommended when the fender cannot be attached directly to the body via the attachment flange either due to production technique or based on the construction conditions of the fender. This type of attachment situation can arise, for example, in the rear area of the fender where the latter must be attached to the front support, the so-called A support. It goes without saying that the attachment part for preventing movement of the fender during its thermal expansion need be fixed not only stiffly and stationary to the attachment flange of the fender, but the attachment part itself be sufficiently stiff. This can be ensured for example by ribs or similar measures.

BRIEF DESCRIPTION OF THE DRAWINGS

Several embodiments of the invention are shown in the drawing and are described in greater detail below.

DESCRIPTION OF THE PREFERRED EMBODIMENTS

Figure 1:
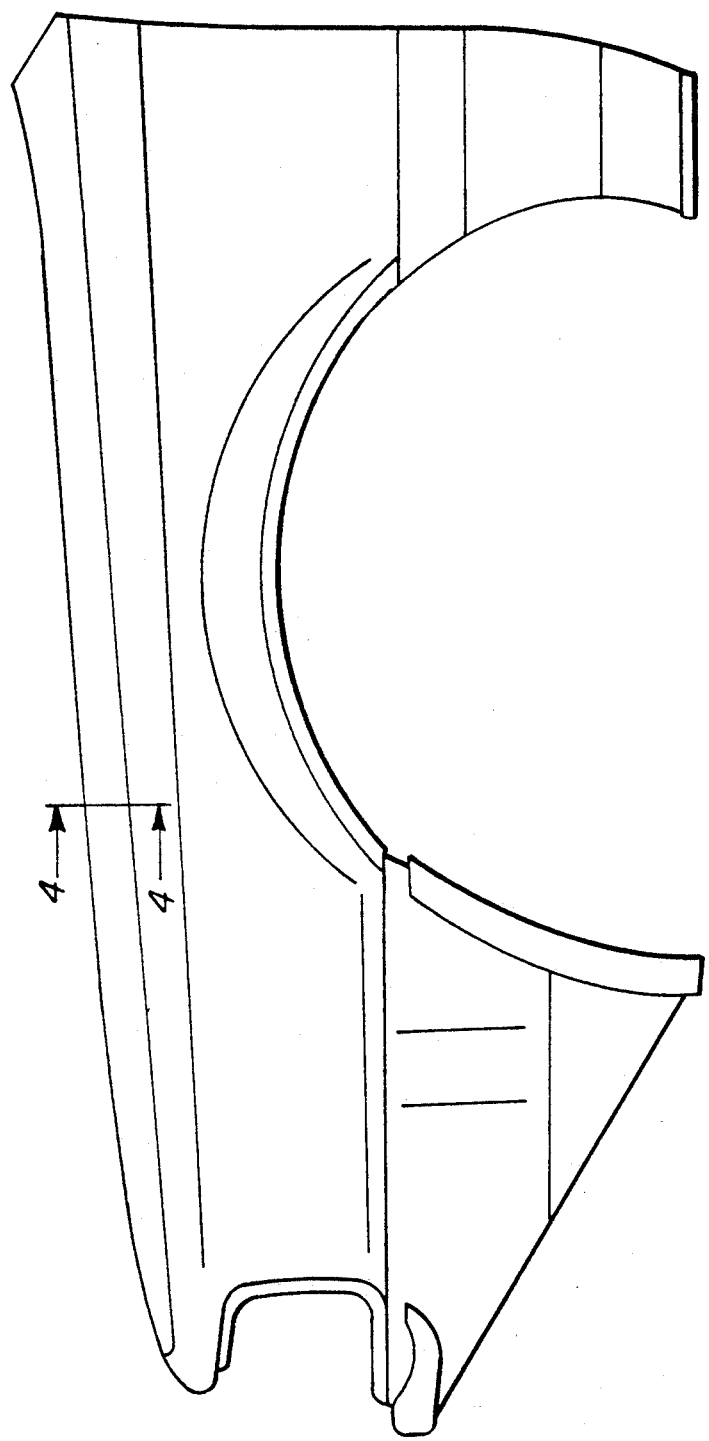
FIG. 1 shows the front left fender of a passenger car in a side view.
Figure 2:
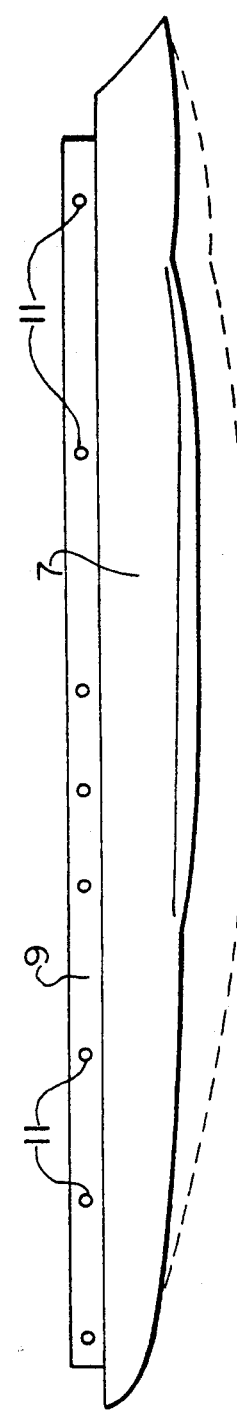
FIG. 2 shows the fender of FIG. 1 in a top view.

Referring to the illustration of the present invention shown in FIGS. 1 and 2 a left front fender 7 of a passenger car is shown in two views. The fender 7 has an attachment flange 9 in its upper edge area; the attachment flange 9 has holes 11.

Fender 7 is attached to the body of the passenger car such that both its upper, its front and also its rear edge area are held stiff and stationary on the body.

This type of attachment results in the fact that the fender 7 bulges to the outside when heated; this is shown in FIG. 2 in exaggerated form by the broken line.

Figure 3:
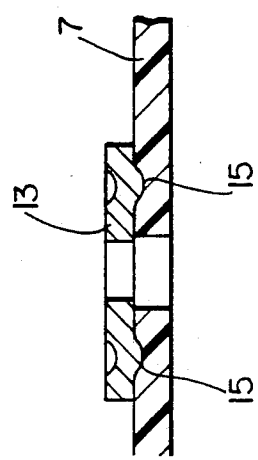
FIG. 3 shows the attachment of the fender to the body of the passenger car.

Several types of attachment of fender 7 on the body are shown in FIGS. 3 through 6. FIG. 3 shows a washer 13 with spherical cup-shaped impressions 15. If the washer 13 is pressed with a screw (not shown) to attach the fender 7, the impressions 15 are pressed into the fender 7, resulting in positive locking which prevents movement of the fender. No notch action occurs due to the shape of the impressions 15.

Figure 4:
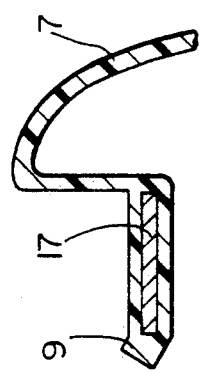
FIG. 4 shows one attachment version with an inserted steel rail.

FIG. 4 shows a section according to line IV—IV in FIG. 1. A steel rail 17 is embedded in the attachment flange 9; in this way stiff and stationary attachment of the fender 7 via holes 11 is ensured.

Figure 5:
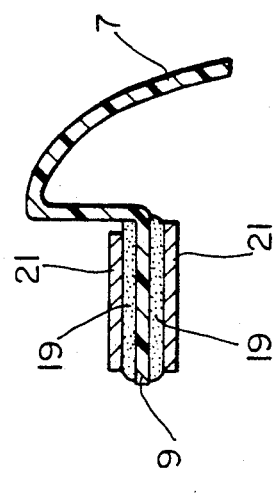
FIG. 5 shows an attachment similar to the attachment of FIG. 4, but with steel rails joined by cementing.

FIG. 5 shows an altered structural shape. There the attachment flange 9 is made in normal material thickness. Steel rails 21 are attached by means of cement 19 on either side of the attachment flange 9; these rails have the same function as the steel rails 17 according to FIG. 4. The difference consists only in that in the latter structural shape the steel rails need not be embedded in the manufacture of the fender 17, but can be attached afterwards.

Figure 6:
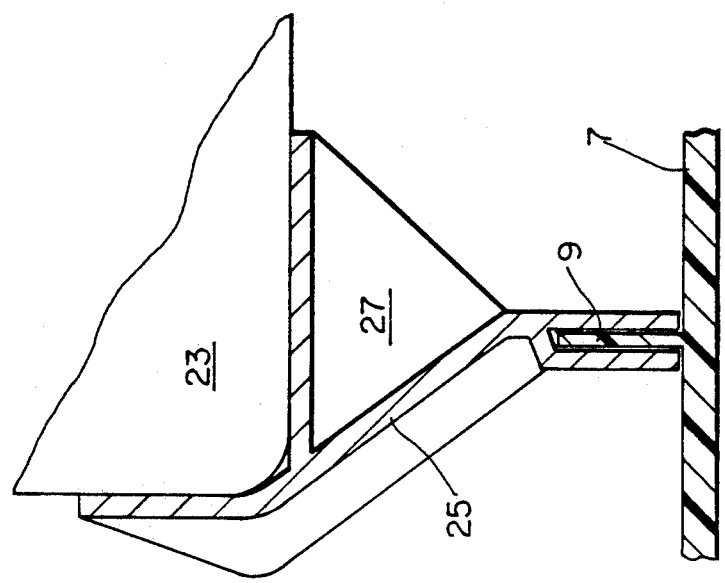
FIG. 6 shows the attachment of the fender by means of a separate attachment part.

A last type of attachment is the subject matter of FIG. 6. For example, the rear edge area of the fender can be attached on the forward door column 23 of the body of a passenger car in the manner shown here. Here also is an attachment flange 9 formed in turn on the fender. The attachment flange 9 is overlapped on both sides by retaining part 25. The connection between the attachment flange 9 and retaining part 25 is properly effected by cementing. The retaining part 25 is guided to the door column 23 with a shape matched to that of the retaining part 25 from this connection area. To reinforce the bar shaped retaining part 25 the latter has ribs 27 in sections.

We claim:

1. A motor vehicle comprising:
a body;
a plastic fender including an upper edge, a forward edge, a rear edge, and at least one attachment flange on one of said upper, forward and rear edges;
means for stiffly and immovably attaching said at least one attachment flange of said fender to said body;
said attaching means comprising a washer including at least one spherical cup-shaped impression and a screw including a head, said washer positioned between said attachment flange and said screw head, said washer impression acting on said attachment flange to achieve a positive lock between said fender and said body.

2. A motor vehicle comprising:
a body;
a plastic fender including an upper edge, a forward edge, a rear edge, and at least one attachment flange on one of said upper, forward and rear edges;
means for stiffly and immovably attaching said at least one attachment flange of said fender to said body;
said attaching means comprising a steel rail embedded in said attachment flange.

3. A motor vehicle comprising:
a body;
a plastic fender including an upper edge, a forward edge, a rear edge, and at least one attachment flange on one of said upper, forward and rear edges;
means for stiffly and immovably attaching said at least one attachment flange of said fender to said body;
said attaching means comprising at least one steel rail secured to at least one side of said attachment flange.

4. The motor vehicle according to claim 3, wherein said at least one steel rail is secured to said attachment flange by cement.

5. The motor vehicle according to claim 3, wherein said attachment flange includes a first side and a second side, said motor vehicle further comprising a first steel rail attached to said first side of said attachment flange and a second steel rail attached to said second side of said attachment flange.

6. The motor vehicle according to claim 5, wherein said steel rails are secured to said attachment flange by cement.

7. A motor vehicle comprising:
a body;
a plastic fender including an upper edge, a forward edge, a rear edge, and at least one attachment flange on one of said upper, forward and rear edges;
means for stiffly and immovably attaching said at least one attachment flange of said fender to said body;
said attaching means comprising a retaining part made of a relatively stiff material, said attachment flange being embedded in said retaining part.

* * * * *